United States Patent
Haller et al.

(10) Patent No.: US 7,908,308 B2
(45) Date of Patent: Mar. 15, 2011

(54) CARRY-SELECT ADDER STRUCTURE AND METHOD TO GENERATE ORTHOGONAL SIGNAL LEVELS

(75) Inventors: Wilhelm Haller, Remshalden (DE); Mark Mayo, Wappingers Falls, NY (US); Ricardo H. Nigaglioni, Austin, TX (US); Hartmut Sturm, Grasellenbach (DE)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 11/748,619

(22) Filed: May 15, 2007

(65) Prior Publication Data

US 2008/0046498 A1 Feb. 21, 2008

(51) Int. Cl.
*G06F 7/508* (2006.01)
(52) U.S. Cl. ....................................................... 708/714
(58) Field of Classification Search .................. None
See application file for complete search history.

(56) References Cited

U.S. PATENT DOCUMENTS

| | | | | |
|---|---|---|---|---|
| 7,277,909 B2* | 10/2007 | Shimooka | | 708/714 |
| 7,509,368 B2* | 3/2009 | Anders et al. | | 708/714 |
| 7,523,153 B2* | 4/2009 | Goyal | | 708/714 |
| 2002/0143841 A1* | 10/2002 | Farooqui et al. | | 708/710 |
| 2004/0243658 A1* | 12/2004 | Shimooka | | 708/714 |
| 2006/0253523 A1* | 11/2006 | Anders et al. | | 708/706 |
| 2009/0132631 A1* | 5/2009 | Goyal | | 708/714 |

* cited by examiner

*Primary Examiner* — David H Malzahn
(74) *Attorney, Agent, or Firm* — Dennis Jung

(57) ABSTRACT

A Carry-Select Adder structure comprising a carry generation network and a multiplexer to select a particular pre-calculatad sum of a bit-group via orthogonal signal levels of a Hot-Carry signal provided by said carry generation network (21), wherein in order to provide orthogonal signal levels of said Hot-Carry signal, the carry generation network (21) comprises two carry lookahead trees (22, 23) working in parallel to each other, wherein a first carry lookahead tree (22) provides a first signal level of the Hot-Carry signal, and a second carry lookahead tree (23) provides a second, compared to the first signal level inverse signal level of the Hot-Carry signal. Furthermore a method to operate such a Carry-Select Adder is described.

12 Claims, 12 Drawing Sheets

Boolean equations:

Generate:

| a | b | g |
|---|---|---|
| 0 | 0 | 0 |
| 0 | 1 | 0 |
| 1 | 0 | 0 |
| 1 | 1 | 1 | and

FIG. 2A

Propagate:

| a | b | p |
|---|---|---|
| 0 | 0 | 0 |
| 0 | 1 | 1 |
| 1 | 0 | 1 |
| 1 | 1 | 1 | or

FIG. 2B

Generate:

| a | b | $\overline{g}$ |
|---|---|---|
| 0 | 0 | 1 |
| 0 | 1 | 1 |
| 1 | 0 | 1 |
| 1 | 1 | 0 | nand

FIG. 2C

Kill:

| a | b | k |
|---|---|---|
| 0 | 0 | 1 |
| 0 | 1 | 0 |
| 1 | 0 | 0 |
| 1 | 1 | 0 | nor

CARRY-SELECT ADDER STRUCTURE AND METHOD TO GENERATE ORTHOGONAL SIGNAL LEVELS

BACKGROUND OF THE INVENTION

The invention relates to a Carry-Select Adder structure comprising a carry generation network and a multiplexer to select particular pre-calculated sums via orthogonal signal levels, plus to a method to generate orthogonal signal levels in such a Carry Select Adder structure.

In elementary arithmetic a carry is a digit that is transferred from one column of digits to another column or more significant digits during a calculation algorithm. When speaking of a digital circuit like an adder structure, the word carry is used in a similar sense. Furthermore when speaking of an adder structure in this document, a binary adder structure is meant.

In most computers, the carry from the Most significant Bit (MSB) of an arithmetic operation is placed in a special carry bit which can be used as a carry-in for multiple precision arithmetic logic circuits or tested and used to control execution of a computer program. Throughout this document a notation is used, where the MSB has the index 0.

With respect to timing, Carry-Select Adder structures are among the fastest. An example of a Carry-Select Adder structure 10 is shown in FIG. 9. As shown in FIG. 9, two pre-calculated sums sum0, sum1 of bit-groups, e.g. bytes 11, 11', 11" are provided, one sum sum1 assuming an initial carry-in of '1', the other sum0 a carry-in of '0', respectively. Thereby particular desired pre-calculated sums sum0, sum1 of the bytes 11, 11', 11" are selected at two-way multiplexers 12, 12', 12" by so-called Hot-Carry signals representing a so-called Hot-Carry, which is the actual carry-in to the appropriate byte 11, 11', 11". By controlling a multiplexer 12, 12', 12" the Hot-Carry signal selects the desired pre-calculated byte sum sum0 or sum1.

Gating of the multiplexer 12, 12', 12" retires orthogonal signal levels of the Hot-Carries. This means that to select a particular pre-calculated sum0 or sum1 of one byte 11, 11', 11", the multiplexer 12, 12', 12" requires not only the Hot-Carry signals but also second signals showing an orthogonal signal level with respect to the Hot-Carry signals. E.g. if the signal level of a Hot-Carry signal is high (i.e. '1'), a second signal having a low signal level (i.e. '0') is required.

The Hot-Carry signals are provided by a carry generation network, also called Hot-Carry network, 13. The Hot-Carry network 13 comprises a carry lookahead tree working with a serial combination of generate- and propagate-based Boolean operations.

According to the state of the art, an orthogonal signal level of Hot-Carry signals is generated by an inverter stage 14, 14', 14". This inverter stage 14, 14', 14" is an additional logical level in the most timing critical Hot-Carry path. Furthermore this inverter stage 14, 14', 14" adds additional load and delay to the most timing critical Hot-Carry signal and increases the Fan-Out of the Hot-Carry.

It is therefore desirable, if the inverter stage can be completely avoided.

SUMMARY OF THE INVENTION

It is therefore an object of the invention to provide a Carry-Select Adder structure wherein orthogonal signal levels used to control a multiplexer that selects particular pre-calculated sums are generated without an additional inverter stage in front of the multiplexer. It is further an object of the invention to provide a method to operate a Carry-Select Adder that does not require an additional inverter stage in order to get orthogonal signal levels.

The first object of the invention is met by a Carry-Select Adder structure comprising a carry generation network and a multiplexer to select a particular pre-calculated sum of a bit-group via orthogonal signal levels of a Hot-Carry signal provided by said carry generation network, wherein in order to provide orthogonal signal levels of said Hot-Carry signal, the carry generation network comprises two carry lookahead trees working in parallel to each other, wherein a first carry lookahead tree provides a first signal level of the Hot-Carry signal, and a second carry lookahead tree provides a second, compared to the first signal level inverse signal level of the Hot-Carry signal.

By arranging two carry lookahead trees in parallel to each other the advantage over the state of the art is achieved, that it is possible to generate two Hot-Carry signals showing orthogonal signal levels without the need of an inverter stage on multiplexer level. Doing so, this inverter stage can be avoided and compared to the state of the art the delay caused by this inverter stage does no longer exist. Preferably the Carry-Select adder exploits two complete pseudo Ling structures, a kill-based one and a generation-based one.

According to a preferred embodiment of the Carry-Select adder according to the invention, the first carry lookahead tree is working with a serial combination of generate- and propagate-based Boolean operations, end the second carry lookahead tree is working with a serial combination of kill- and not-generate-based Boolean operations. By using a generate- and propagate-based carry lookahead tree in parallel to a kill- and not-generate-based carry lookahead tree, orthogonal logical levels of the Hot-Carry signal are achieved.

According to another preferred embodiment of the Carry-Select Adder according to the invention, the carry lookahead trees are implemented at least partly with AI2 (NAND) and OI2 (NOR) gates. An AI2 gate is an AND-Invert-gate with two inputs and one output. An AI2-gate preferably is used to implement a not-generate-based Boolean operation, also known as a NAND operation. An OI2-gate is an OR-Invert-gate with two inputs and one output. An OI2-gate preferably is used to implement a kill-based Boolean operation, also known as a NOR operation. Using AI2-gates and OI2-gates is the simplest way to implement a Carry-Select Adder structure according to the invention.

According to an additional preferred embodiment of the Carry-Select Adder according to the invention, the carry lookahead trees at least partly are implemented with complex AOIxy and OAIxy gates. Complex gates like e.g. AOIxy and OAIxy gates allow simplifying the implementation of particularly the kill- and not-generate-based Boolean operations of the second carry lookahead tree. Thereby AOI means AND-OR-invert and OAI means OR-AND-Invert. The indices x and y denote the number of inputs of the first gate (x) and the number of inputs of the parallel second gate (y) respectively. According to a particular preferred embodiment of the Carry-Select Adder according to the invention, the carry lookahead trees are implemented at least partly with complex AOIxy and OAIxy gates as well as with AI2 (NAND) and OI2 (NOR) gates. This implementation is the most effective way to implement a Carry-Select Adder structure according to the invention. According to a preferred embodiment of the Carry-Select Adder according to the invention, an AI2-AI2 stage is arranged either in the kill- or in the generation-based carry lookahead tree, in order to achieve orthogonal signal levels at multiplexer level. In fact, an AOI21 stage would be replaced by an AI2-AI2 stage and a parallel inverter, or an OAI21 stage would be replaced by an OI2-OI2 stage with a parallel inverter. To explain OAI21 replacement, the following is considered:

OAI21 function $$\overline{(\overline{x+y})z} = z + xy$$

implemented with OI2-OI2 results in $$\overline{(\overline{x+y}) + \overline{z}} = \overline{z + xy}.$$

AOI21 replacement; $\overline{xy+z}$ implemented with AI2-AI2 results in $\overline{xy*\overline{z}} = z+xy$. This achieves the inversion of the original function. The other gates of the chosen level of the tree, either AI2 gates or OI2 gates are replaced by AI2-Inv or OI2-Inv, respectively. The replacement can take place at any appropriate level of the carry tree structure, see FIG. 7.

The second object of the invention is met by a method to generate orthogonal signal levels in a Carry-Select Adder structure as mentioned above, wherein two carry lookahead trees are used in parallel to each other, said carry lookahead trees using different Boolean operations, also called carry functions, providing orthogonal logical levels at the outputs of the carry lookahead trees. By a first kill-based carry function performed in parallel to a second carry function (for example a generate-based or propagate-based carry function) orthogonal signal levels are generated without the need of an additional inverter stage. This has the advantage over the state of the art, that delay usually caused by the inverter stage is avoided.

A preferred embodiment of the method according to the invention is characterized in that the Boolean operations of the first carry lookahead tree are generate- and propagate-based and the Boolean operations of the second carry lookahead tree are kill- and not-generate-based.

BRIEF DESCRIPTION OF THE DRAWINGS

The foregoing, together with other objects, features, and advantages of this invention can be better appreciated with reference to the following specification, claims and drawings, with FIG. 1 showing a schematic view of a Carry Select Adder structure according to the invention, FIG. 2 showing an overview of the different Boolean operations, FIG. 3 showing a schematic view of a generate based carry lookahead tree implemented with AI2/OI2 gates, FIG. 4 showing a schematic view of a Kill based carry lookahead tree implemented with AI2/OI2 gates, and an OAI21 and an OI2 to achieve orthogonality, FIG. 5 showing a schematic view of a generate based carry lookahead tree implemented with complex AOIxy/OAIxy gates, FIG. 6 showing a schematic view of a kill based carry lookahead tree implemented with complex AOIxy/OAIxy gates, FIG. 7 showing a schematic view of a modified kill based carry lookahead tree implemented with complex AOIxy/OAIxy gates and AI2/OI2 gates to achieve orthogonality, compared to FIG. 5.

DETAILED DESCRIPTION

Figure 1:
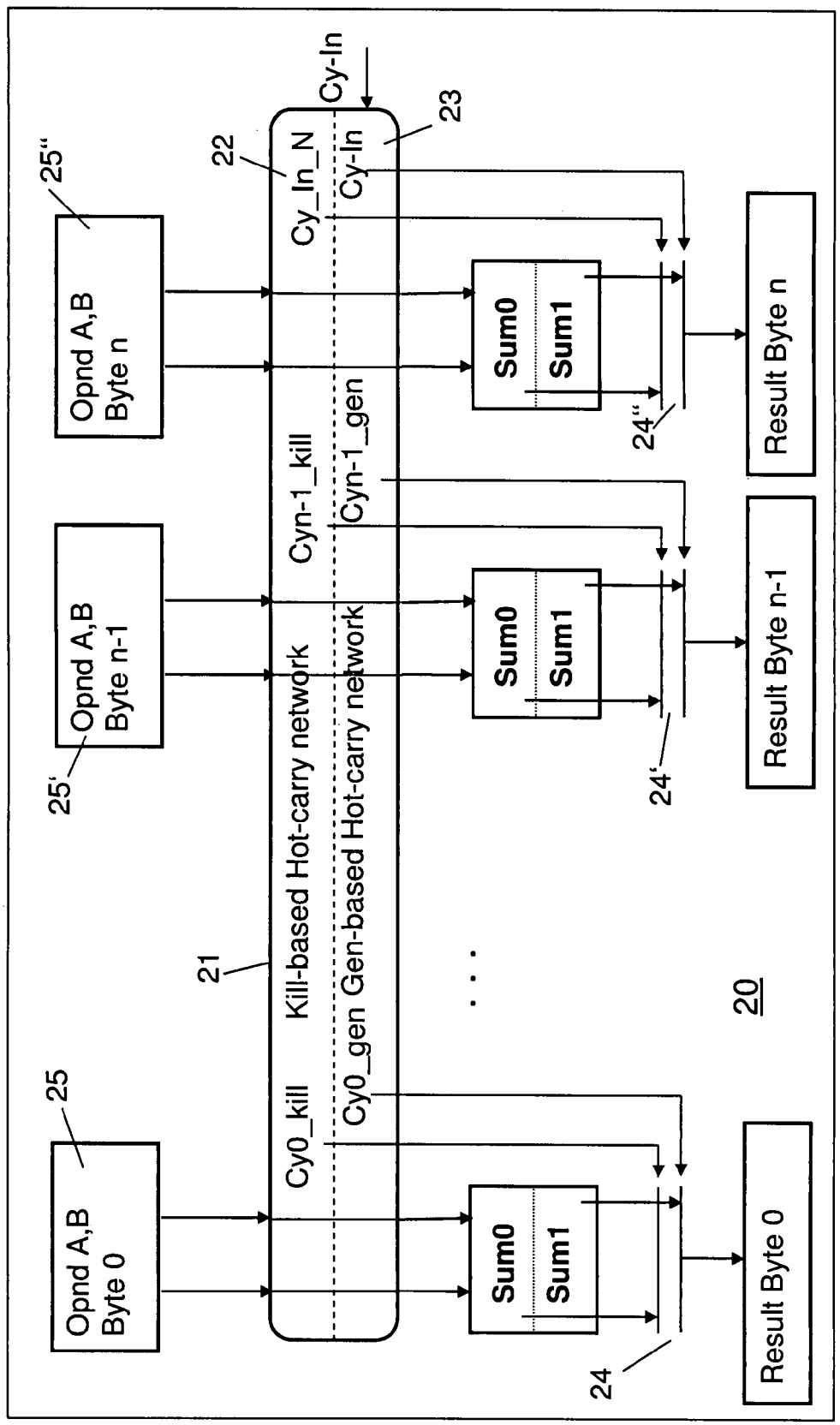

A carry select adder structure 20 as shown in FIG. 1 comprises a carry generation network 21 with two carry lookahead trees 22, 23. The first carry lookahead tree 22 is based on generate and propagate Boolean operations, and the second one 23 is based on kill and not-generate Boolean operations in order to achieve orthogonal signals for controlling a multiplexer 24. Pre-calculating the sums sum0 and sum1 of a byte 25, 25', 25" as well as selecting a particular sum sum0 or sum1 via the multiplexer 24 is done by feeding the multiplexer 24 with the orthogonal signal levels of the Hot-Carry signal provided by the two carry lookahead trees 22, 23 at the same time, wherein each signal level is fed to an individual input of the multiplexer 24.

In FIGS. 2A to 2D four Boolean equations are shown that are preferably used in a Carry-Select Adder structure according to the invention. The so-called generate-based carry function in FIG. 2A is a Boolean AND operation. Both operands a and b have to have a value of '1' in order to generate an output with a value of '1'. The so-called propagate-based carry function in FIG. 2B is a Boolean OR operation. At least one of the operands a or b has to have a value of '1' in order to generate an output with a value of '1'. The so-called inverse-generate- or not-generate-based carry function shown in FIG. 2C is a Boolean NAND operation. All combinations of operands except both operands having a value of '1' generate an output value of '1'. In FIG. 2D a so-called kill-based carry function is shown. It is a Boolean NOR operation, wherein an output value of '1' is generated only if both operands a and b have the value '0'.

It is important to mention, that for a specific implementation the groups of bits can be of any size and it is not required to be a byte. For the following examples and the chosen technology it is of advantage to choose a byte as a unit. This is due to the available gates like e.g. AI2/OI2 NAND/NOR or complex gates of type AOI/OAI.

In general the output signals Cyi_kill and Cyi_gen (where i is the index of the particular bits 25, 25', 25") of the kill-based carry lookahead tree 23 and the generation-based carry lookahead tree 22 are orthogonal to each other and thus able to gate the correct sum sum0 or sum1 through the multiplexer 24 (see FIG. 1).

Applying a Pseudo-Ling approach and looking at byte 1 of a 64 bit operand the formulas for the select signals at the multiplexer for result byte 0 are following (Notice; $p^8/g^8$ is factored out, furthermore e.g. pipj is the abbreviation of (pi AND pj) sometimes also pi*pj; the sign + is the placeholder for an OR):

$$C8 = g8 + g9 + p9p10(g10 + g11 + p11p12(g12 + g13 + p13p14(g14 + g15 + p15p16c16))) \quad \text{(I)}$$

$$C8\_N = k8 + k9 + \overline{g}9\overline{g}10(k10 + k11 + \overline{g}11\overline{g}12(k12 + k13 + \overline{g}13\overline{g}14(k14 + k15 + \overline{g}15\overline{g}16\overline{c}16))) \quad (II)$$

$$Cy0\_gen = C8 * p8$$

$$Cy0\_kill = C8\_N * \overline{g}8$$

to clarify: $p16c16$ and $\overline{g}16\overline{c}16$ in equation (I) and (II) are replaced by the actual carry-in (Cy_In/$\overline{\text{Cy\_In}}$) if the least significant byte is considered (byte n in FIG. 1). Looking at byte 1 as in equation (I) and (II). $c16$ is the carry-in from byte 2 but with $p16$ factored out. As in (I), where $p8$ is factored out, $p16$ is factored out in $c16$. So in a later level $p16$ must be factored in to $c16$ again.

Example: In order to simplify the description, all examples assume only an operand length of 16 bits (i.e. bit 0 to 15). To show the regular structure of the schematic an operand bit A<16> and B<16> is added.

In a real implementation the actual carry-in (Cy-In) would replace the operand bits 16. For wider operands the same structure is used for higher bytes, but the tree to get the Cy_gen/Cy_kill increases in height.

Figure 3:
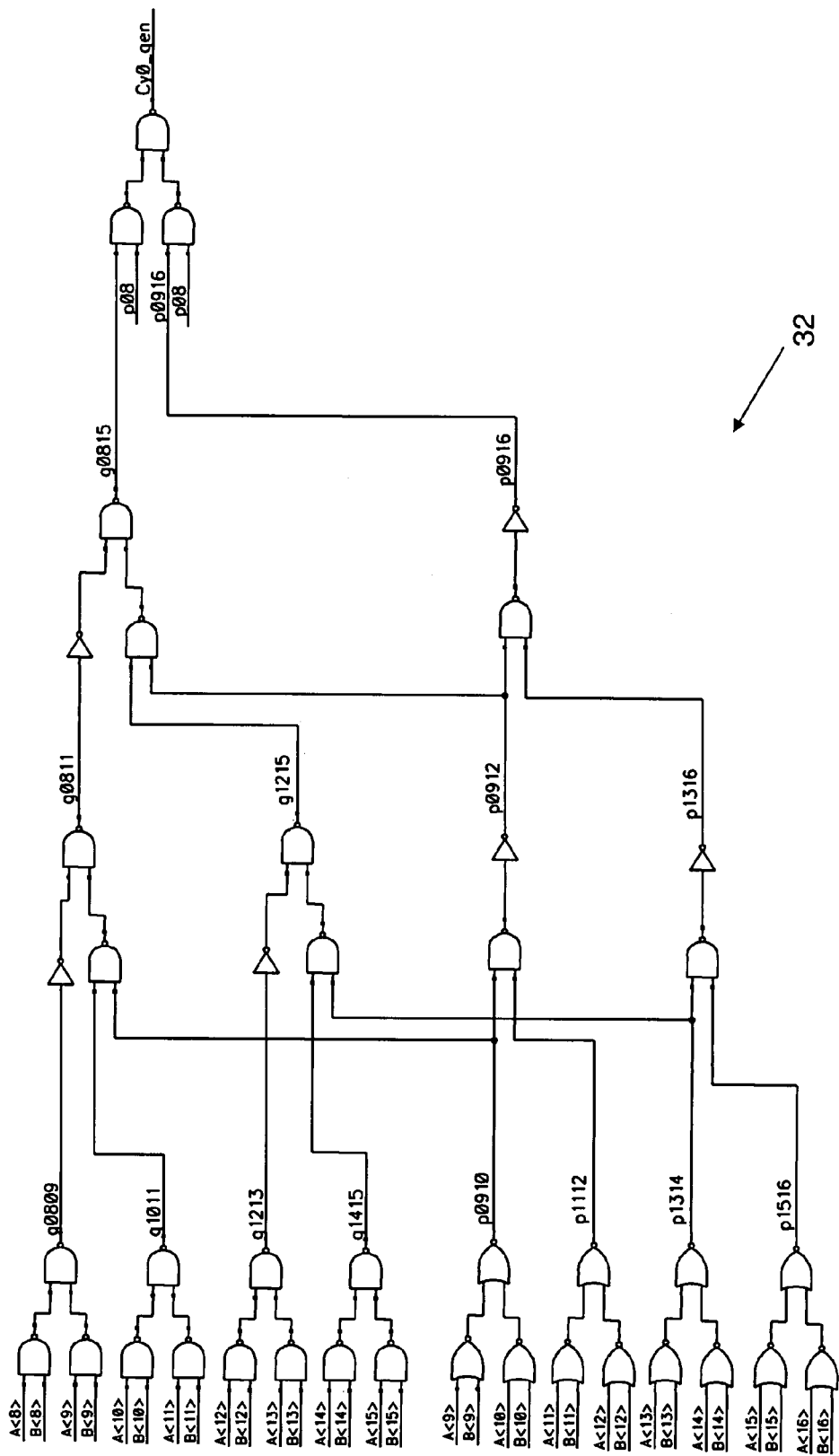
Figure 4:
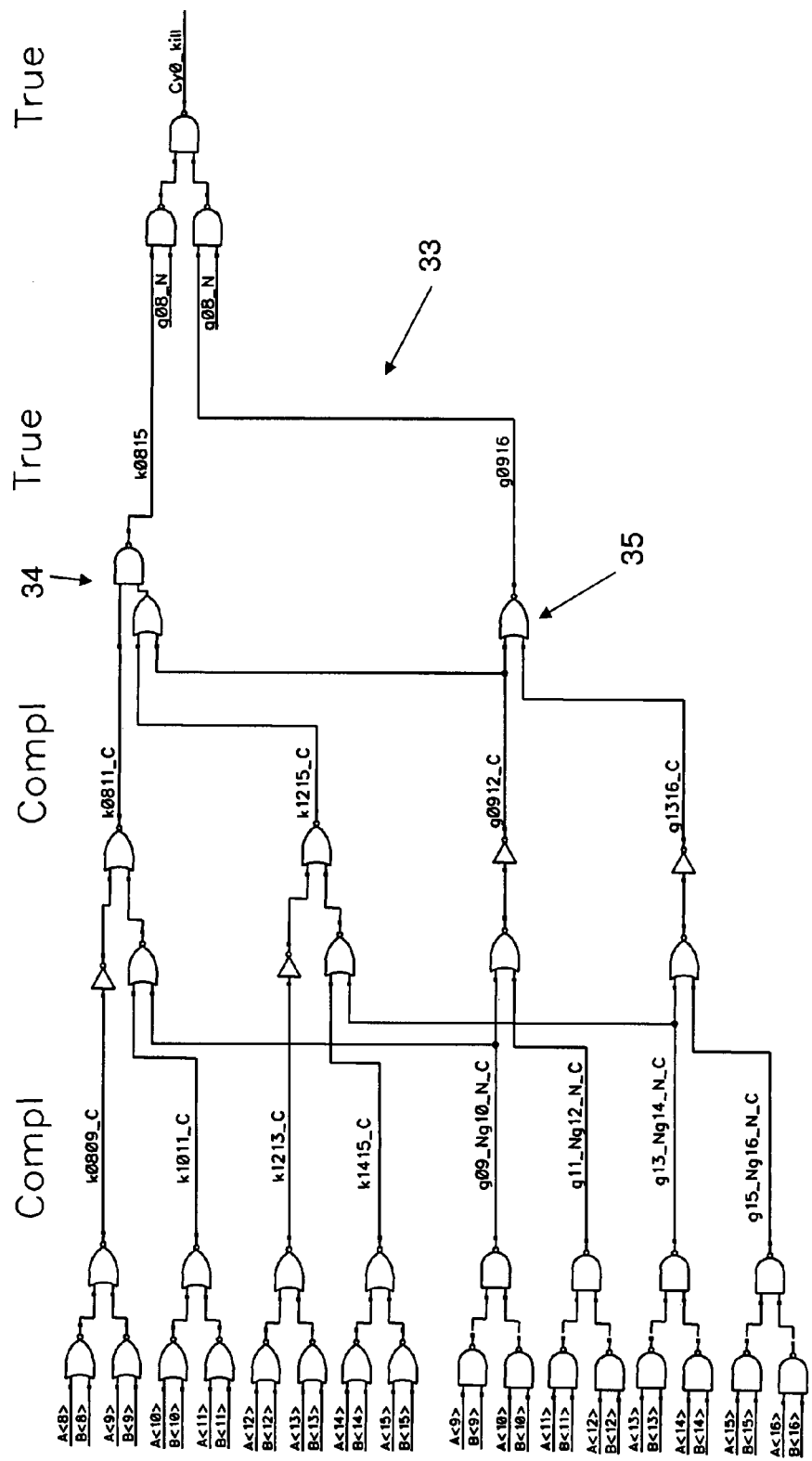
Figure 9:
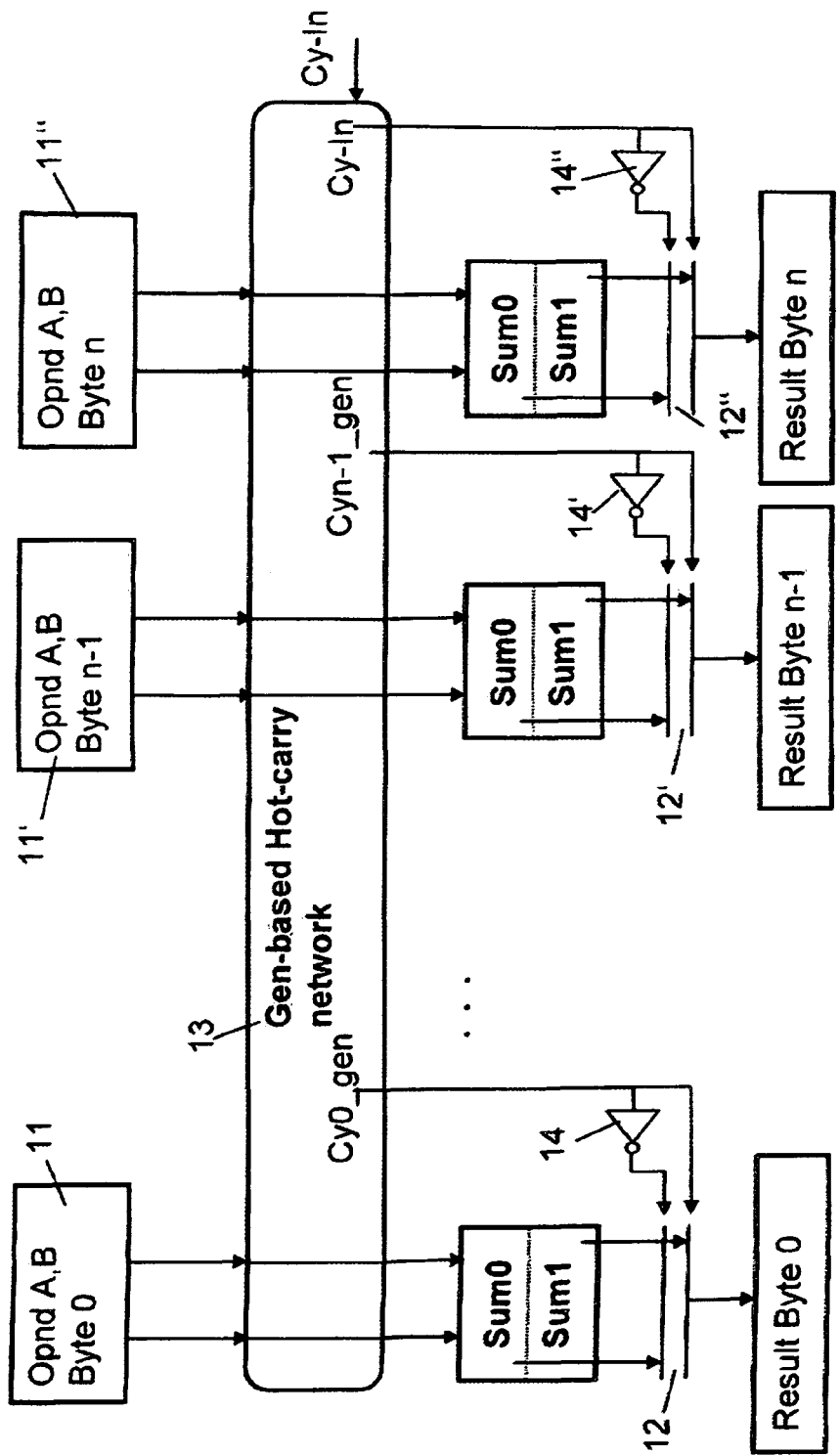

FIG. 3 and FIG. 4 show schematics of orthogonal carry lookahead trees 32, 33, implemented with AI2 (NAND) and OI2 (NOR). Thereby FIG. 3 shows the generate-based carry lookahead tree 32 and FIG. 4 the kill-based carry lookahead tree 33. In the carry lookahead tree 32 the g0815 and p0916 terms are used to select the next bytes carry select. The signal Cy0_gen is the generate-based Hot-Carry for multiplexer control. A16 and B16 are placeholders for a carry-in of a neighboring byte. In the carry lookahead tree 33 the k0815 and g0916 terms are also used to select the next bytes carry select. The signal Cy0_kill is the kill-based Hot-Carry for multiplexer control. In both trees 32, 33 based on generate and kill have similar path delay. Compared to the state of the art, the inverter stage required to control the multiplexer is avoided (compare FIG. 9). Doing so, the main aspect of the invention is fulfilled without restrictions. To change the logic level in FIG. 4 a complex gate 34 is applied. More particularly the Kill based carry lookahead tree in FIG. 4 is implemented with AI2/OI2 gates, and an OAI21 34 and an OI2 35 to achieve orthogonality.

Figure 5:
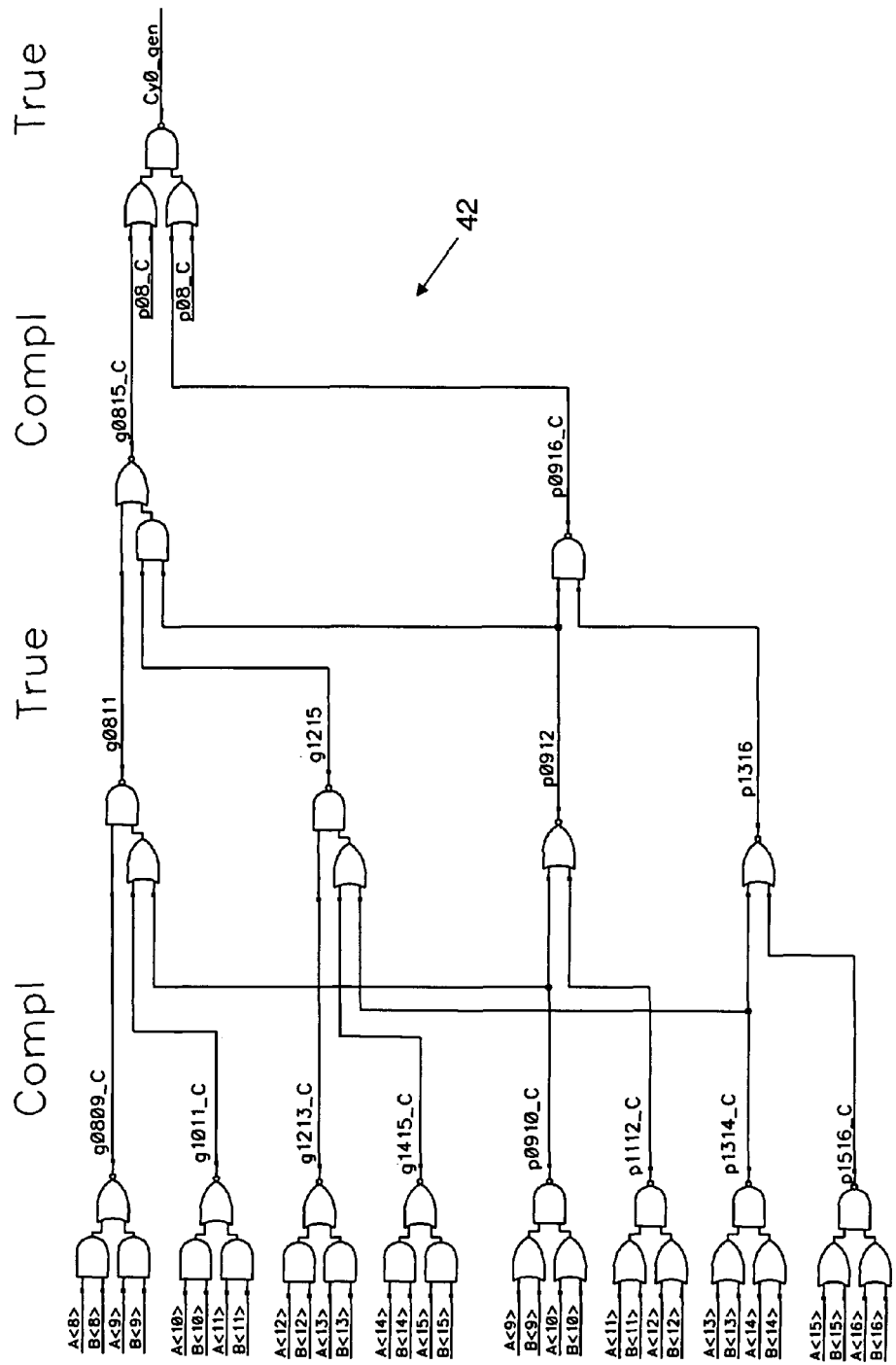
Figure 6:
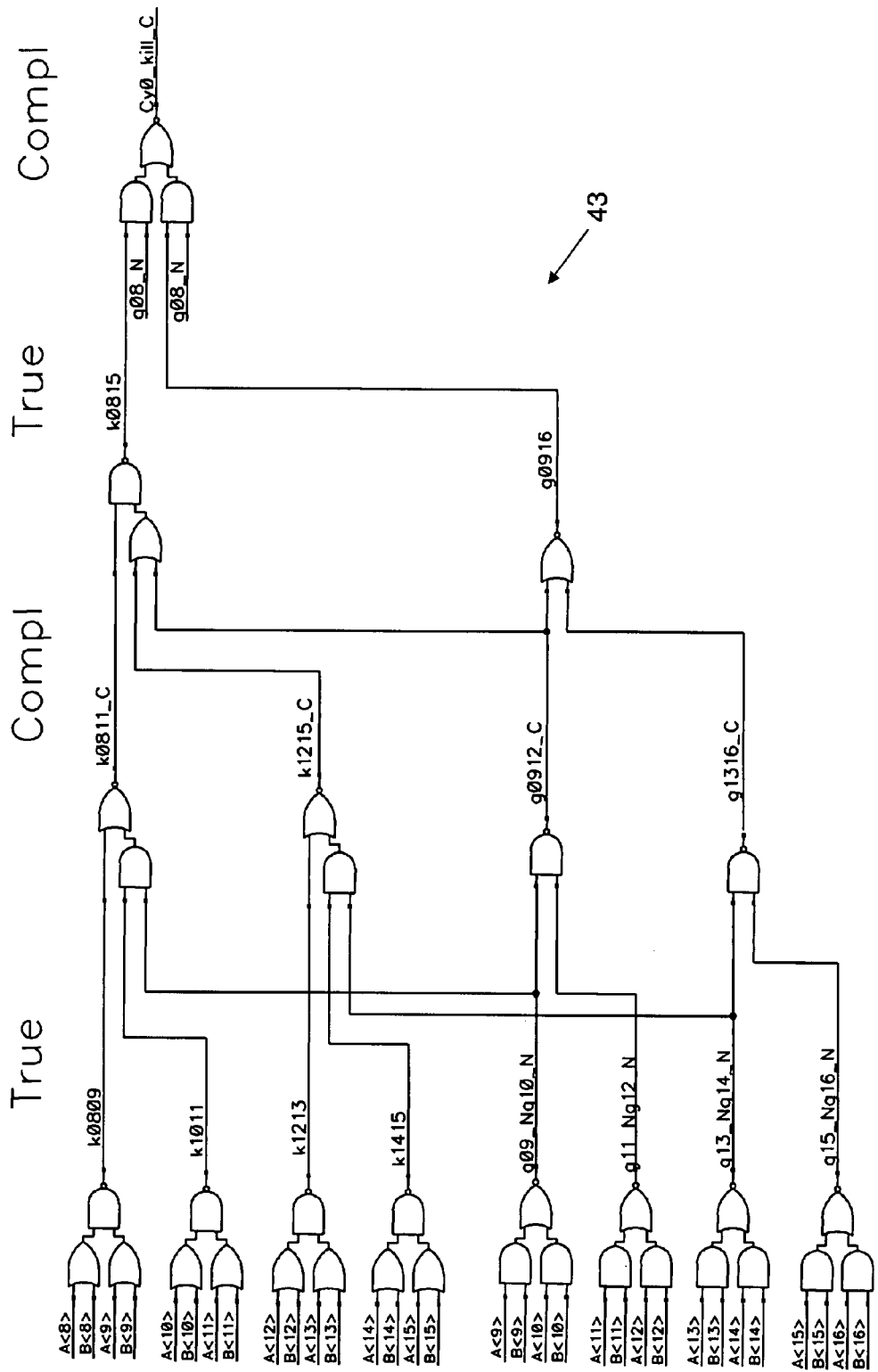

FIG. 5 and FIG. 6 show schematic views of simplified orthogonal carry lookahead trees 42, 43, implemented with complex gates like AOIxy and OAIxy. Thereby FIG. 5 shows the generate-based carry lookahead tree 42 and FIG. 6 the kill-based carry lookahead tree 43. In the carry lookahead tree 42 the g0815_C and p0916_C terms are again used to select the next bytes carry select. The signal Cy0_gen is the generate "based Hot-Carry for multiplexer control. In the carry lookahead tree 43 the k0815 and g0916 terms are also used to select the next bytes carry select. The signal Cy0_kill is the kill-based Hot-Carry for multiplexer control. Both trees 42, 43 based on generate and kill have similar path delay. Compared to the state of the art, the inverter stage required to control the multiplexer is again omitted (compare FIG. 9).

Thereby the problem arises, that the output signal level of the schematics according to FIG. 5 and FIG. 6 is the same, although the logical functions Cy0_gen and Cy0_kill_C are orthogonal. This is due to the fact, that the AOI gates do an inversion at every level. As there are an odd number of levels both signals Cy0_gen and Cy0_kill_C are either both '0' or both '1'.

Figure 7:
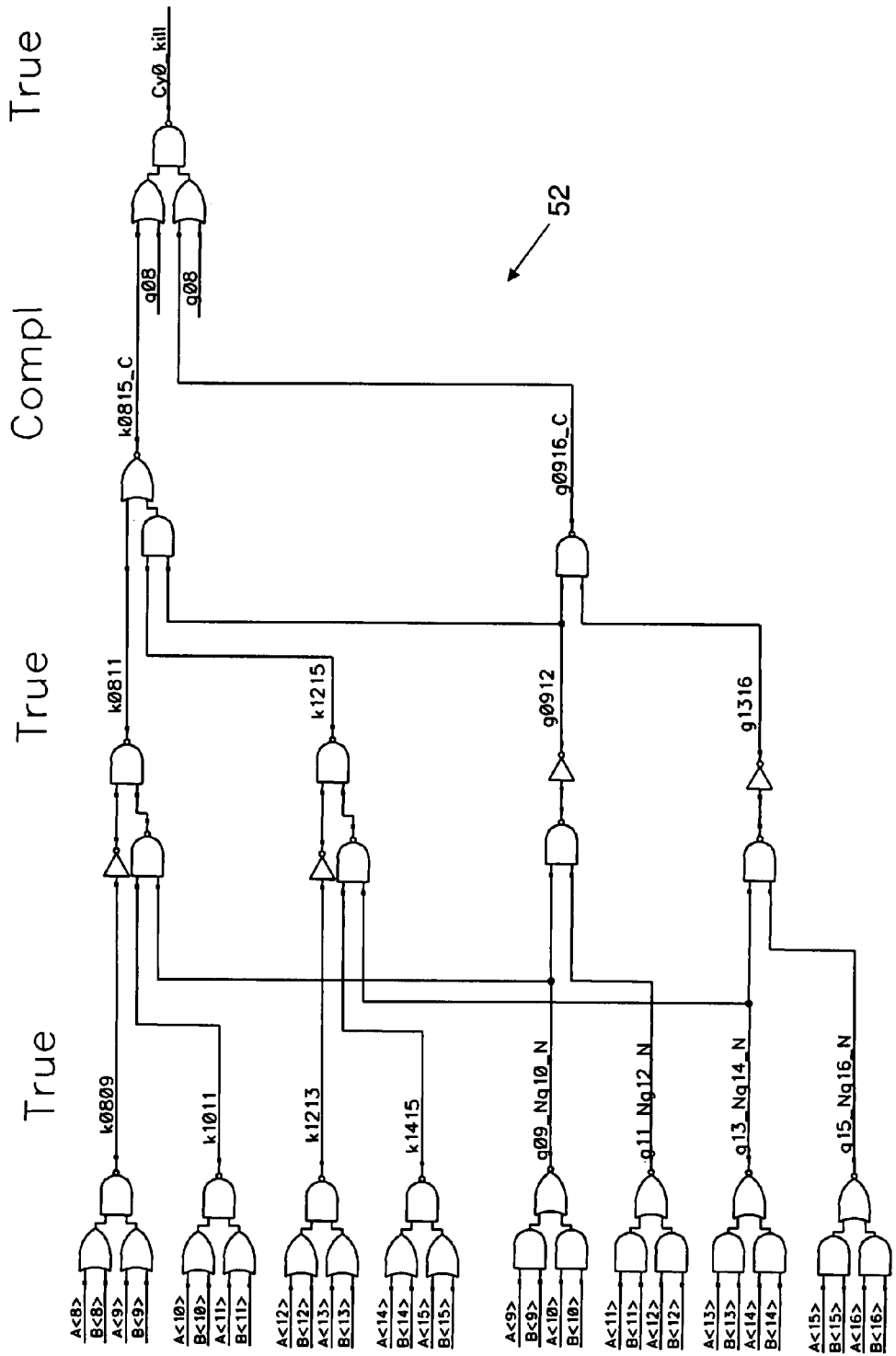

In order to achieve orthogonal signal levels at the output Cy0_gen/Cy0_kill it is suggested to replace an AOI/AI2 stage in FIG. 6 by an AI2-AI2/AI2-I stage or to replace an OAI/OI2 stage in FIG. 6 by an OI2-OI2/OI2-I stage, respectively, as indicated in FIG. 7. Thereby an AI2-AI2 stage is arranged either in the kill- or in the generation-based carry lookahead tree, in order to achieve orthogonal signal levels at multiplexer level. In fact, an AOI21 stage would be replaced by an AI2-AI2 stage and a parallel inverter, or an OAI21 stage would be replaced by an OI2-OI2 stage with a parallel inverter. To explain OAI21 replacement, the following is considered:

$$\overline{(\overline{x} + \overline{y})z} = z + xy$$

with OI2-OI2 results in $$\overline{(\overline{x} + \overline{y}) + \overline{z}} = \overline{z} + \overline{xy}.$$

AOI21 replacement: $\overline{xy + z}$ with AI2-AI2 results in $$\overline{\overline{xy} * \overline{z}} = z + xy.$$

This achieves inversion of the function. The other gates of the chosen level of the tree, either AI2 gates or OI2 gates are replaced by AI2-Inv or OI2-Inv, respectively (FIG. 7). The replacement can take place at any appropriate level of the carry tree structure.

FIGS. 5 and 7 show a simplified implementation of a carry lookahead tree 52 based on complex gates. AI2-AI2/OI2-OI2 stages replace a complex stage AOI21/OAI21 to avoid the problem mentioned above. From that stage down to the end of the tree AOI21/OAI21 have to be exchanged (FIG. 7).

It is now also possible to choose either a kill-based or a gen-based function and start at an appropriate stage with an AI2-AI2/OI2-OI2 combination in parallel to an AOI21/OAI21 stage (FIG. 1). From that point down the tree it is possible to build the parallel schematic tree 53 according to FIG. 8. Thereby it is important to mention that it the starting gate outputs a true level signal the next gate down the tree is an AOI21 gate. If the starting gate outputs a complement value the next gate is an OAI21 type. The starting point of the parallel and logically orthogonal carry tree can start at every stage depending on what offers best performance.

It is further important to mention that the disclosed solution applies standard static CMOS gates and is geared towards the usage of complex gates of AOI/OAI type.

Figure 8:
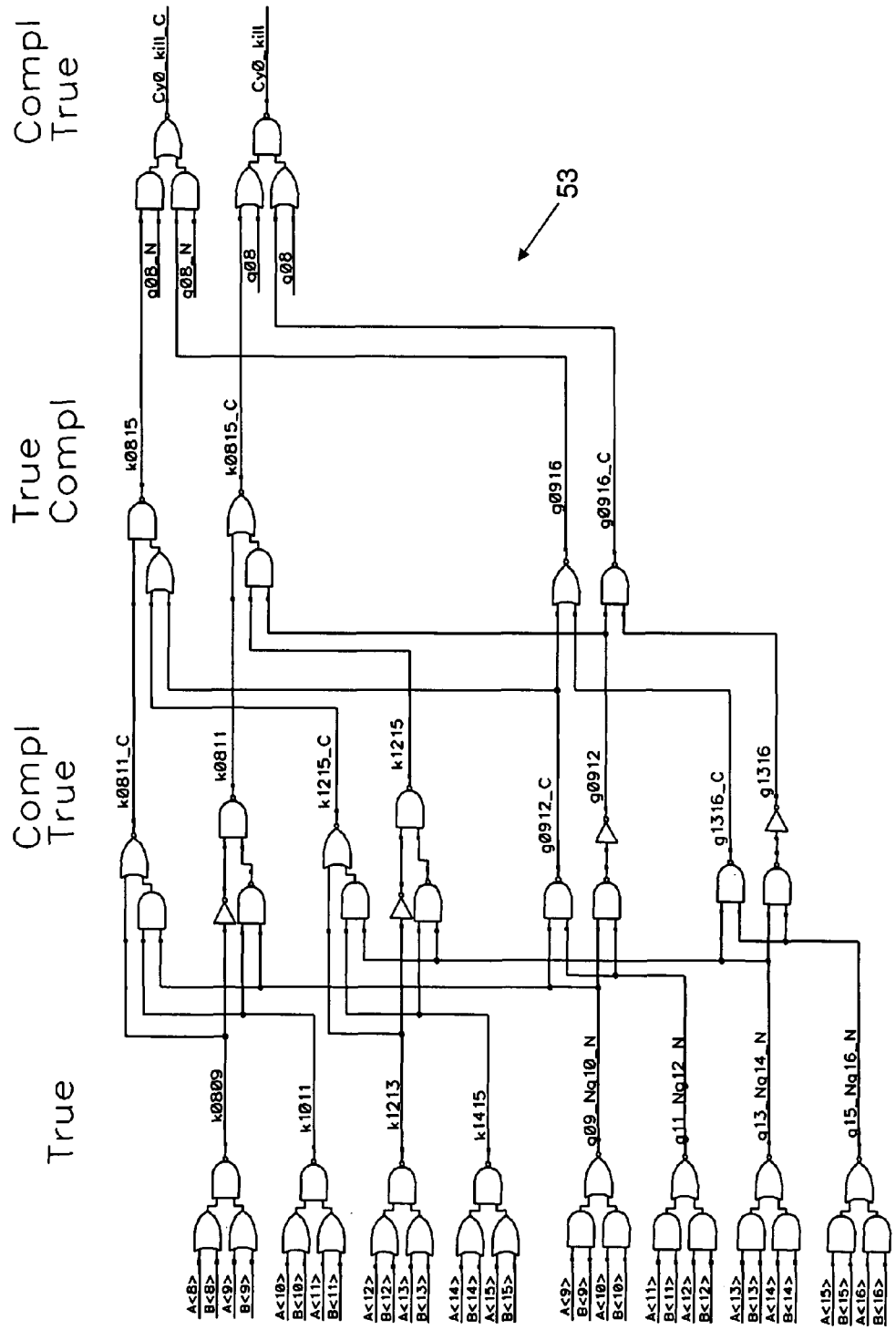
FIG. 8 showing a schematic view of a kill based carry lookahead tree with duplicated partial tree for orthogonal output signals, FIG. 9 showing a schematic view of a Carry Select Adder structure according to the state of the art, FIG. 10 showing a schematic graph structure of a generate-based carry generation network, FIG. 11 showing a schematic graph structure of a kill-based carry generation network, and FIG. 12 showing a schematic graph structure of a partially duplicated carry generation network according to the invention with kill-based and generation-based Boolean operations.
Figure 10:
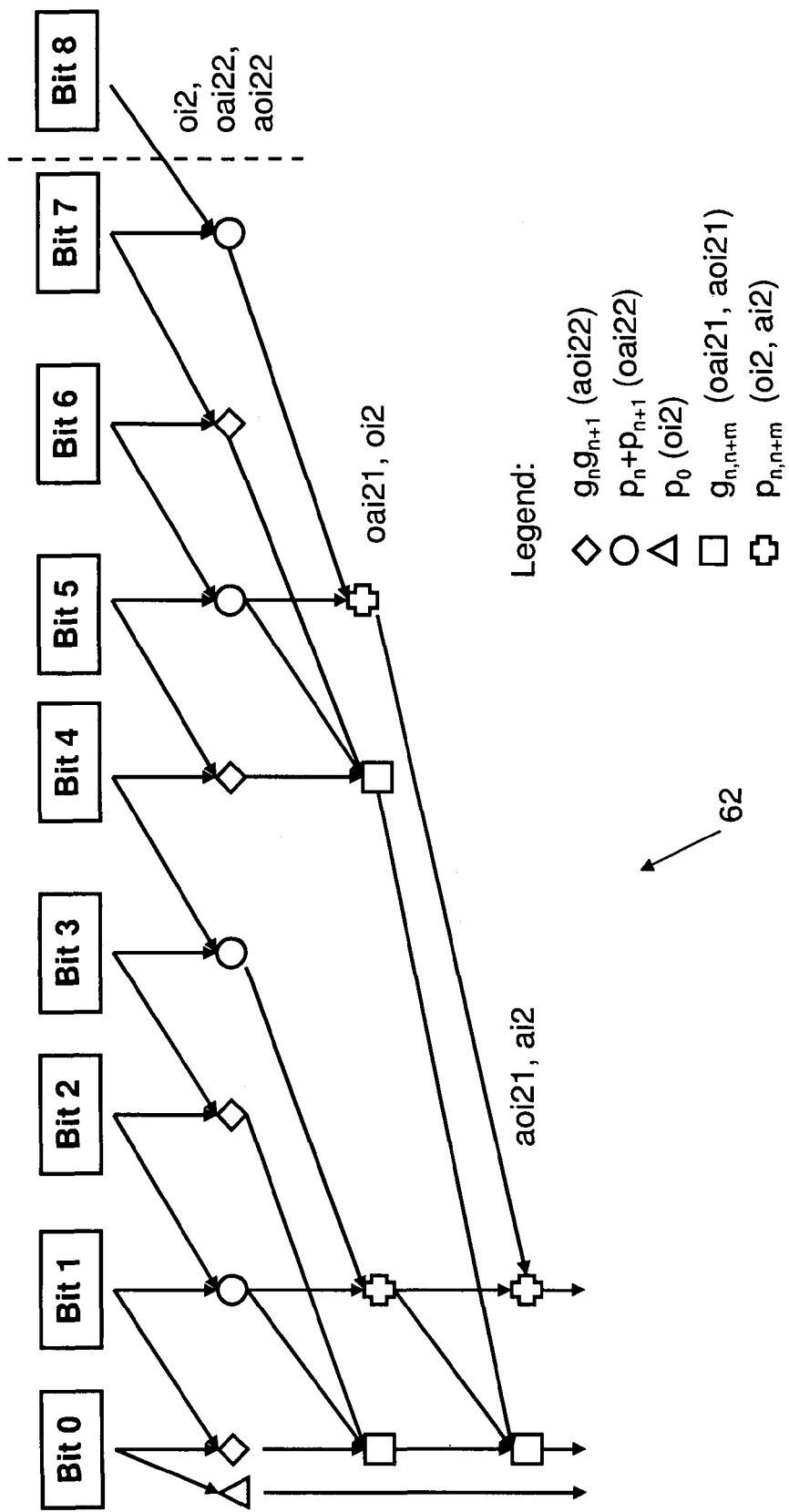
Figure 11:
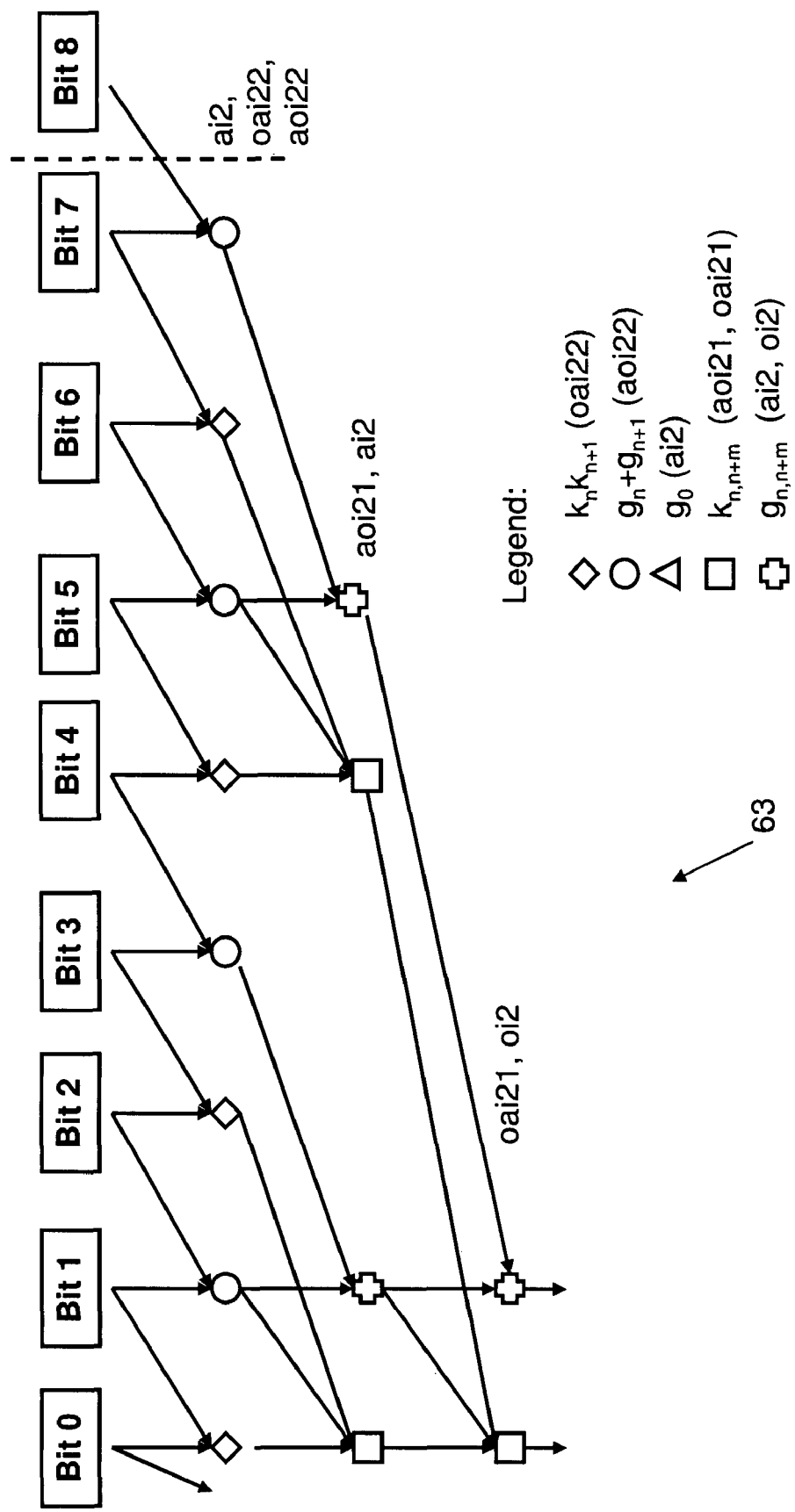
Figure 12:
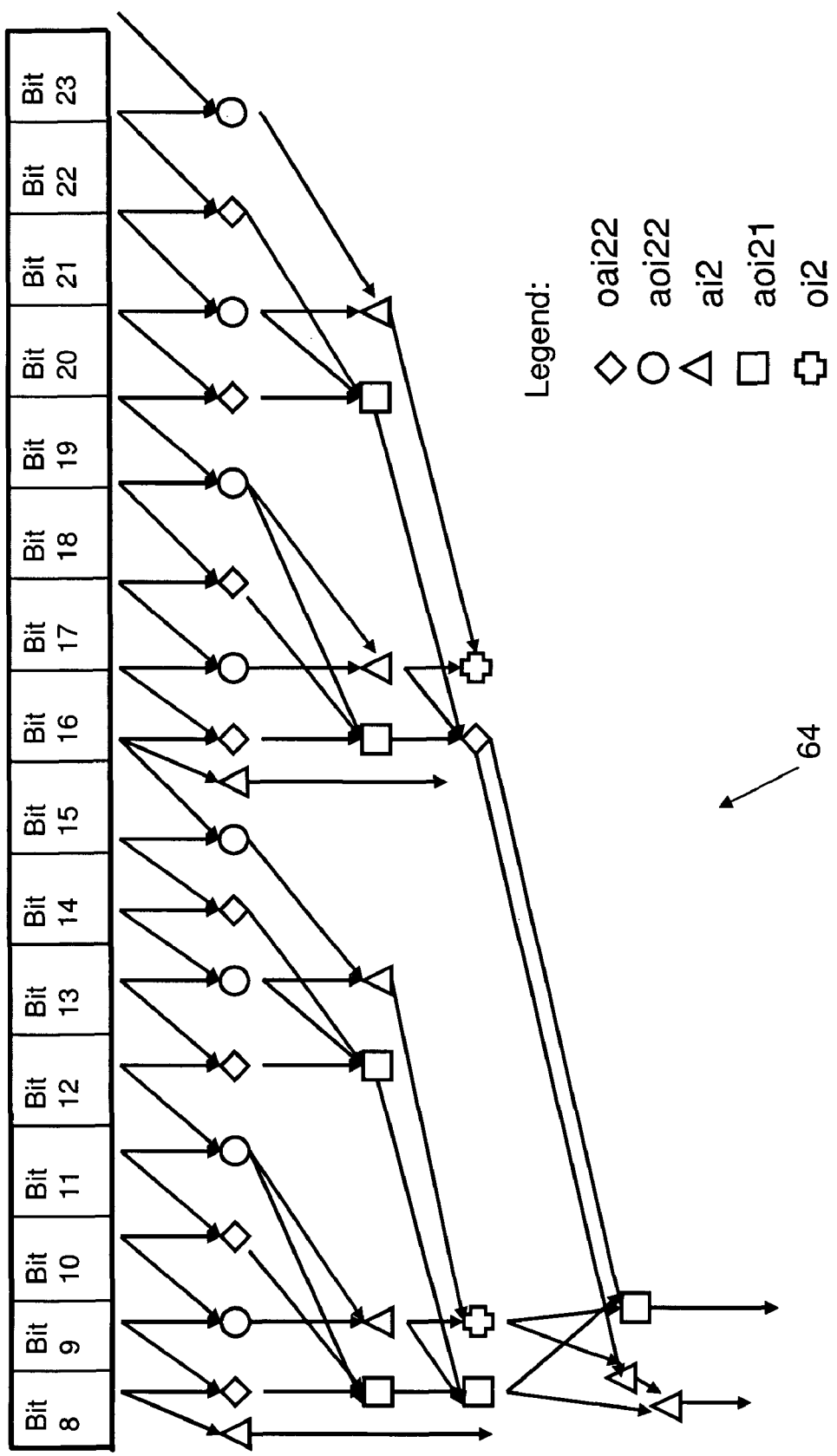

For further explanation, FIG. 10 shows the graph structure 62 of a generate-based carry generation network as shown in FIG. 5, and FIG. 11 the graph structure 63 of a kill-based carry generation network as shown in FIG. 7. According to the invention, in addition to the well known generate (g) and propagate (p) term an additional kill (k) function (FIG. 11) is applied in parallel to the generate and propagate functions. A graph structure 64 of a partially duplicated carry generation network according to the invention with kill-based and generation-based Boolean operations is shown in FIG. 12. Thereby FIG. 12 shows the graph structure of a partially duplicated carry generation network as shown in FIG. 8.

The invention has the advantage over the state of the art, that it allows to replace the highly loaded inverter stage at multiplexer level by a parallel structure, and that it thus offers performance improvements.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as failing within the true scope and spirit of the present invention.

The invention claimed is:

1. A Carry-Select Adder structure comprising:
   a carry generation network and a multiplexer for selecting a particular pre-calculated sum of a bit-group via orthogonal signal levels of a Hot-Carry signal provided by said carry generation network; and
   wherein the carry generation network comprises two carry lookahead trees working in parallel, wherein a first one of the carry lookahead trees provides a first signal level of the Hot-Carry signal, and a second one of the carry lookahead trees provides an inverse signal level, compared to the first signal level, of the Hot-Carry signal.

2. The Carry-Select Adder structure according to claim 1, wherein the first carry lookahead tree is working with a serial combination of generate and propagate based Boolean operations, and the second carry lookahead tree is working with a serial combination of kill and not-generate based Boolean operations.

3. The Carry-Select Adder structure according to claim 2, wherein the carry lookahead trees are at least partly implemented with AI2 (NAND) and OI2 (NOR) gates.

4. The Carry-Select Adder structure according to claim 2, wherein the carry lookahead trees are at least partially implemented with complex AOIxy and OAIxy gates.

5. The Carry-Select Adder structure according to claim 2, wherein the carry lookahead trees are at least partially implemented with complex AOIxy and OAIxy gates as well as with AI2 (NAND) and OI2 (NOR) gates.

6. The Carry-Select adder according to claim 2, wherein an AI2-AI2 stage is arranged either in the kill or in the generate based carry lookahead tree for providing orthogonal signal levels at multiplexer level.

7. The Carry-Select adder according to claim 3, wherein an AI2-AI2 stage is arranged either in the kill or in the generate based carry lookahead tree for providing orthogonal signal levels at multiplexer level.

8. The Carry-Select adder according to claim 4, wherein an AI2-AI2 stage is arranged either in the kill or in the generate based carry lookahead tree for providing orthogonal signal levels at multiplexer level.

9. The Carry-Select adder according to claim 5, wherein an AI2-AI2 stage is arranged either in the kill or in the generate based carry lookahead tree for providing orthogonal signal levels at multiplexer level.

10. A method for generating orthogonal signal levels in a Carry-Select Adder structure comprising the steps of:
    selecting a particular pre-calculated sum of a bit-group via orthogonal signal levels of a Hot-Carry signal using a carry generation network and a multiplexer, said Hot-Carry signal provided by said carry generation network;
    providing a first signal level of the Hot-Carry signal from a first carry lookahead tree;
    providing a second signal level of the Hot-Carry signal from a second carry lookahead tree, wherein the second signal level is an inverse of the first signal level and is provided in parallel with the first signal level.

11. The method of claim 10, further comprising the step of:
    said first and second carry lookahead trees each using different Boolean operations for providing said first and second signal levels of the Hot-Carry signal.

12. The method according to claim 11, wherein the Boolean operations of the first carry lookahead tree are generate and propagate based and the Boolean operations of the second carry lookahead tree are kill and not-generate based.

* * * * *